Nov. 26, 1929.    G. L. SHARP    1,737,062
PNEUMATIC TIRE PUMP
Filed March 2, 1929    2 Sheets-Sheet 1
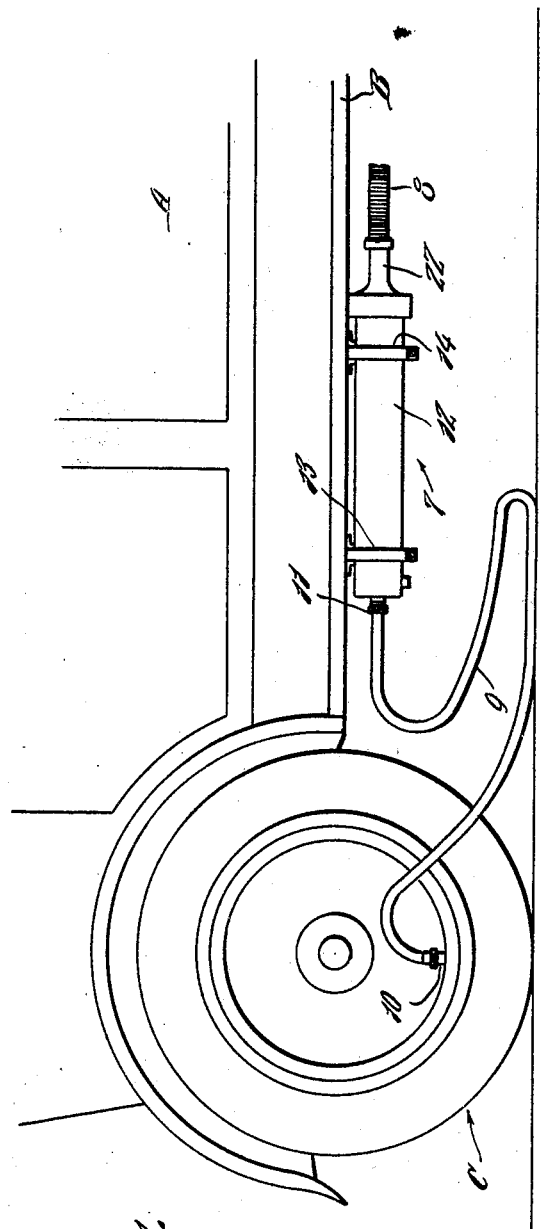
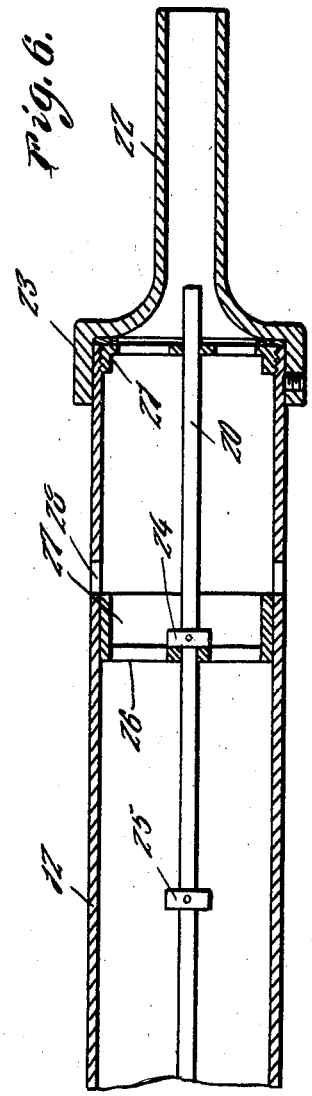
Inventor
Grady L. Sharp
By Clarence A. O'Brien
Attorney Nov. 26, 1929.  G. L. SHARP  1,737,062
PNEUMATIC TIRE PUMP
Filed March 2, 1929  2 Sheets-Sheet 2
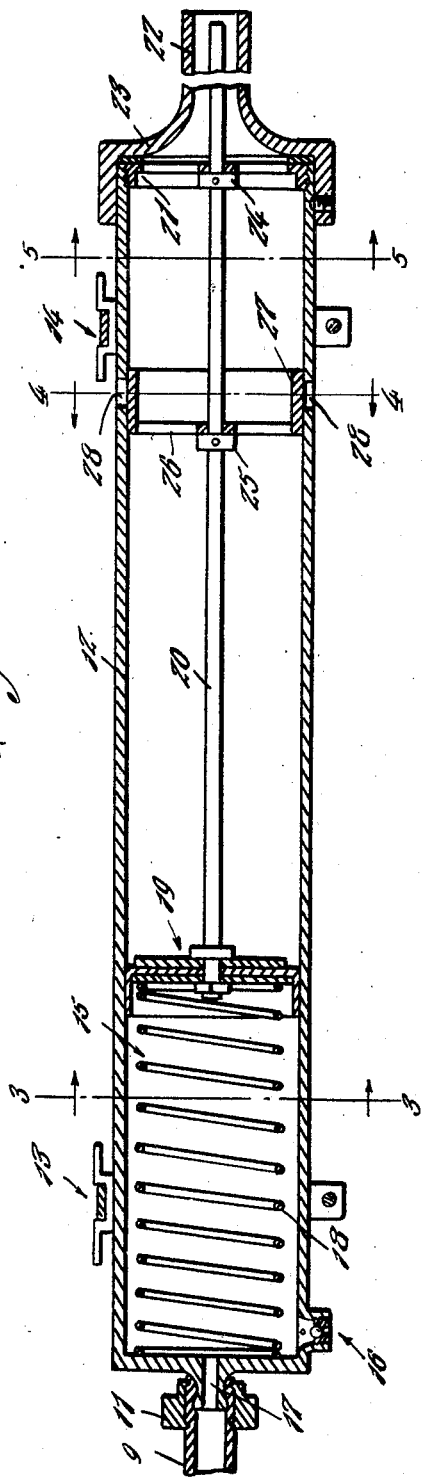
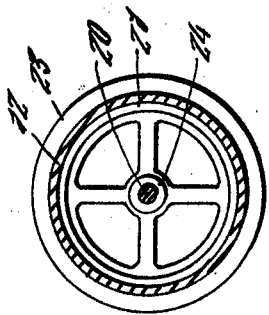
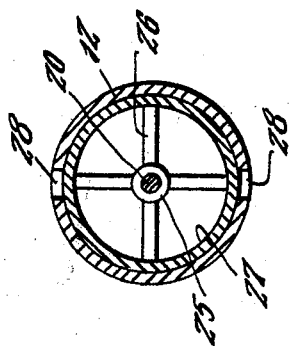
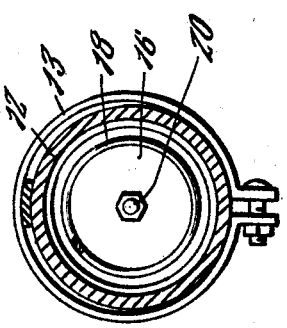
Inventor
*Grady L. Sharp*
By *Clarence A. O'Brien*
Attorney Patented Nov. 26, 1929

1,737,062

UNITED STATES PATENT OFFICE

GRADY L. SHARP, OF ORANGE, VIRGINIA

PNEUMATIC TIRE PUMP

Application filed March 2, 1929. Serial No. 344,017.

This invention relates to an improved automobile accessory in the form of an inflation pump for pneumatic tires and has more particular reference to a type of pump which is carried on the running board and which is constructed to be automatically operated by self-acting pressure means.

In accordance with the present construction, I have provided an unusual form of rectilinear piston pump which is permanently attached to the running board and which is especially constructed to be actuated through the medium of exhaust pulsation from the motor.

In carrying out the invention I have involved and produced a novel structural organization of details, which is so co-related as to decidedly simplify the pump structure and to utilize otherwise wasted exhaust as the power medium.

Other features and advantages will become more readily apparent from the following description and drawings.

Figure 1 is a side elevational view of a fragmentary portion of an automobile, showing the pump in position thereon and showing the hose connected with a pneumatic tired wheel.

Figure 2 is a longitudinal section on an enlarged scale through an improved pump cylinder and its cooperating accessory.

Figures 3, 4, and 5 are transverse vertical sections taken approximately upon the plane of the lines 3—3, 4—4 and 5—5 respectively of Figure 2.

Figure 6 is a view similar to Figure 2 showing the piston rod at the end of its air compressing and ejecting stroke.

The general arrangement and association is seen in Figure 1, wherein it will be observed that A designates the fragmentary portion of the body of the automobile or motor vehicle, B, the running board, and C a pneumatic tire equipped wheel. The improved exhaust pump is generally designated by the reference character 7, the exhaust supply pipe as at 8, the air hose at 9, the tire valve coupling 10 and the hose union 11. The pump primarily comprises an elongated cylinder 12 suspended from the under side of the running board by appropriate hanger brackets 13 and 14 respectively.

Confining attention now, more particularly to Figure 2, it will be seen that the cylinder 12 has a smooth internal bore, that the atmospheric air enters the compression end or chamber 15 through an air intake check valve 16 and escapes through the discharge nipple 17 into the hole. Confined in this chamber 15 is a compression coiled spring 18 bearing against one end of the cylinder and also bearing at the opposite end against the packing equipped piston head 19. This piston head is mounted on the piston rod 20 and this piston rod extends through a central bearing opening in the spider portion of the threaded collar 21. In fact, it extends beyond this collar and into the reduced neck portion 22 of the reducing coupling enclosing head 23 on the right hand end of the cylinder. The exhaust supply pipe 8 is connected with the neck 22.

When the piston is in the position seen in Figure 2, there is a stop collar 24 which engages the bearing of the collar 21. At a longitudinally spaced point is a similar collar 25, and this cooperates with the bearing formed at the center of the spider arm 26, on the valve ring 27. This ring is cooperable with diametrically opposite discharge ports 28 for the exhaust.

In practice, it is obvious that the exhaust puffs enter the cylinder and pass through the spiders into the accumulating chamber 29. In this chamber, the pressure builds up and forces the piston head 19 against the tension of the spring 18.

In so doing, air enters the valve 16 and is forced out through the outlet 17 and through the hose 9 into the tire of the wheel. At a predetermined time during this operative stroke of the piston, the stop collar 24 engages and slides the valve 27 from the position seen in Figure 2, to the position seen in Figure 6. This, therefore uncovers the ports 28 and allows the exhaust to escape. Then the spring 18 comes into play and returns the piston to its normal position. In this way, a continual reciprocatory action of the piston is produced, thereby permitting the exhaust to serve as a power medium for operating the piston and permitting the piston to serve for forcing the air under pressure into the tire cylinder.

A careful consideration of the description in conjunction with the drawings will enable the reader to obtain a clear understanding of the assembly, construction and arrangement and the features and advantages, as well as the operation of the invention. Therefore a more lengthy description is regarded unessential.

Minor changes in the shape, size and rearrangement of details coming within the field of invention claimed may be resorted to, in actual practice, if desired.

I claim:

1. A pneumatic inflation pump comprising a cylinder having a valved air inlet and discharge for the air at one end, a piston mounted for sliding in said cylinder, said piston including a head and a rod, said head being disposed intermediate the ends of the cylinder and dividing the cylinder into individual chambers, the chamber of the first mentioned end of the cylinder constituting an air compression and supply chamber, a return spring in said last named chamber cooperable with the head of the piston for normally maintaining the piston in a predetermined position, pressure supply means connected to the opposite end of the cylinder and communicating with the remaining chamber, said last named chamber being provided with pressure relief ports, a valve for controlling said ports mounted for sliding motion in said cylinder, said piston rod having operating connection with said valve.

2. In a tire inflation pump of the class described, a cylinder provided at one end with an air intake valve, an air discharge means, a guide bearing at the opposite end of the cylinder, pressure supply and connecting means at the last named end of the cylinder, a piston slidable in said cylinder and including a head normally occupying a position intermediate the ends of the cylinder and dividing the cylinder into separate chambers, said piston including a rod slidable through said guide bearing, a coiled return spring in the air compression chamber at the first named end of the cylinder, said cylinder having exhaust relief ports formed in the wall of the remaining chamber, an annular valve in said last named chamber cooperable with said port, and longitudinally spaced stop collars on the piston rod alternately engageable with said valve for opening and closing the valve.

In testimony whereof I affix my signature.

GRADY L. SHARP.